US 007817614B2

(12) United States Patent (10) Patent No.: US 7,817,614 B2
Yang et al. (45) Date of Patent: Oct. 19, 2010

(54) METHOD AND APPARATUS FOR SETTING, TRANSMITTING AND RECEIVING DATA FOR VIRTUAL CARRIER SENSING IN WIRELESS NETWORK COMMUNICATION

(75) Inventors: Chil-youl Yang, Yongin-si (KR); Chang-yeul Kwon, Seongnam-si (KR); Tae-kon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1543 days.

(21) Appl. No.: 11/042,115

(22) Filed: Jan. 26, 2005

(65) Prior Publication Data

US 2005/0163150 A1  Jul. 28, 2005

(30) Foreign Application Priority Data

Jan. 26, 2004 (KR) ........................ 10-2004-0004697
Oct. 21, 2004 (KR) ........................ 10-2004-0084405

(51) Int. Cl.
*H04J 3/16* (2006.01)
*H04B 7/212* (2006.01)

(52) U.S. Cl. ...................................... 370/346
(58) Field of Classification Search ................ 370/338, 370/331, 401, 400, 445, 443, 447, 448, 449
See application file for complete search history.

(56) References Cited

U.S. PATENT DOCUMENTS 5,925,127 A    7/1999   Ahmad
6,169,742 B1   1/2001   Chow et al.
6,717,926 B1*  4/2004   Deboille et al. ............. 370/330
7,274,707 B2*  9/2007   Choi et al. ................... 370/445
2002/0071448 A1  6/2002  Cervello et al.
2002/0120465 A1  8/2002  Mori et al.
2002/0169974 A1  11/2002 McKune
2002/0181426 A1  12/2002 Sherman
2003/0128684 A1* 7/2003  Hirsch et al. ................ 370/338
2003/0133469 A1* 7/2003  Brockmann et al. ......... 370/445
2003/0147415 A1  8/2003  Dore et al.
2003/0161340 A1  8/2003  Sherman
2003/0174664 A1  9/2003  Benveniste (Continued)

FOREIGN PATENT DOCUMENTS

EP          1376304 A2    1/2004

(Continued)

OTHER PUBLICATIONS

Jean-Lien C. Wu, et al., "An adaptive multirate IEEE 802.11 wireless LAN", Information Networking, 2001, Proceedings. 15th International Conference on, Jan. 31-Feb. 2, 2001, pp. 411-418.

*Primary Examiner*—Chirag G Shah
*Assistant Examiner*—Nima Mahmoudzadeh
(74) *Attorney, Agent, or Firm*—Sughrue Mion, PLLC

(57) ABSTRACT

Methods and apparatuses for setting, transmitting, and receiving virtual carrier sensing information in wireless network communications are provided. A receiving station in a wireless communications network receives a frame transmitted according to various modulation schemes and extracts information concerning virtual carrier sensing from a portion of the frame modulated using a basic modulation scheme, so that virtual carrier sensing is achieved using the extracted virtual carrier sensing information.

21 Claims, 16 Drawing Sheets

U.S. PATENT DOCUMENTS

| | | | |
|---|---|---|---|
| 2004/0095911 A1* | 5/2004 | Benveniste et al. | 370/338 |
| 2004/0153909 A1* | 8/2004 | Lim et al. | 714/714 |
| 2005/0138194 A1* | 6/2005 | Lu et al. | 709/230 |

FOREIGN PATENT DOCUMENTS

| | | | |
|---|---|---|---|
| JP | 2002-198974 A | 7/2002 |
| JP | 2003-324445 A | 11/2003 |
| RU | 2158479 C2 | 10/2000 |
| RU | 2192096 C2 | 10/2002 |
| WO | 2004/071021 A1 | 8/2004 |

\* cited by examiner

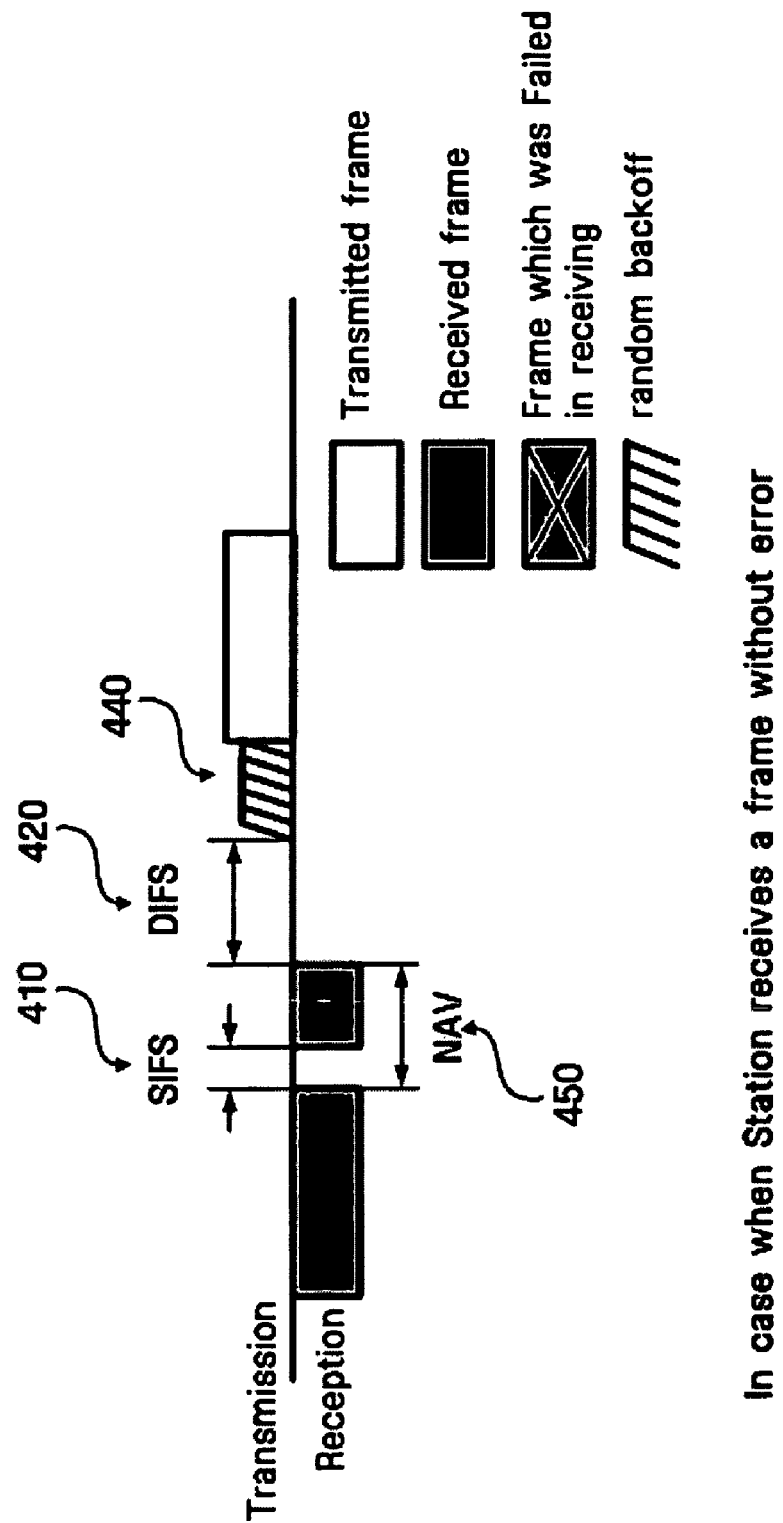

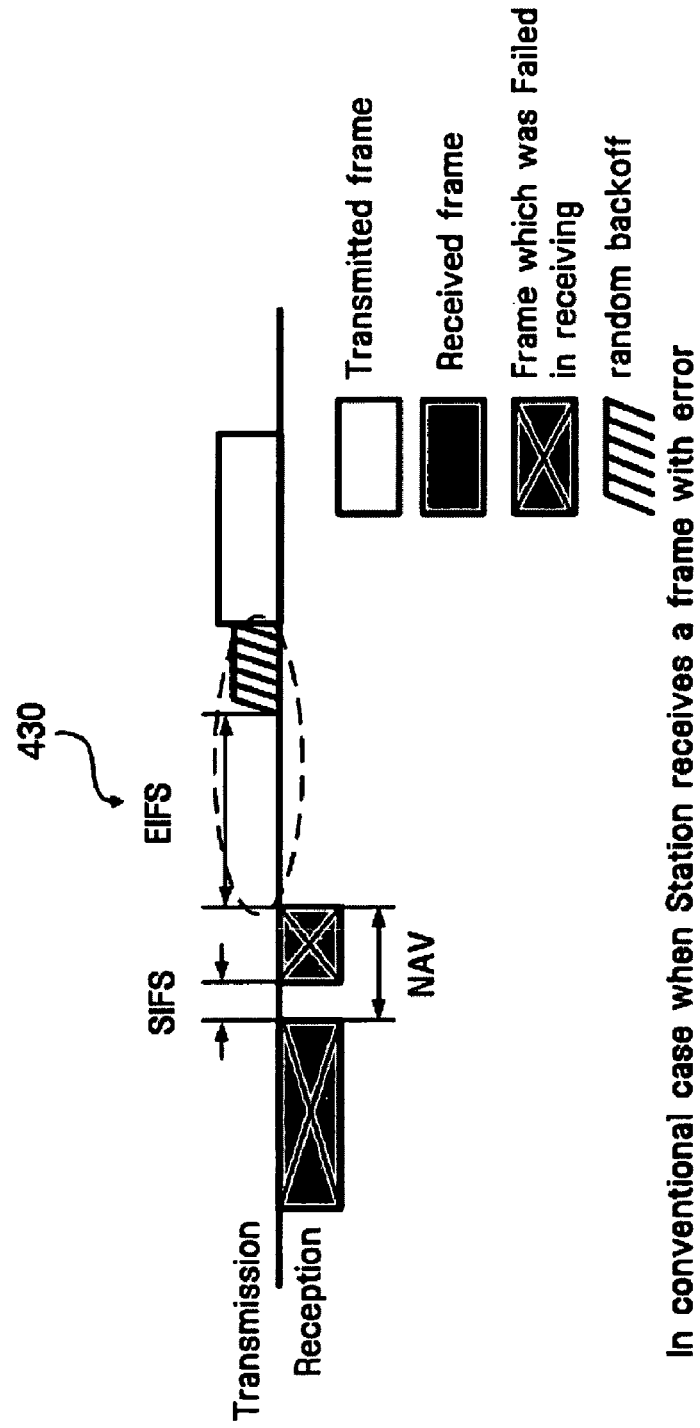

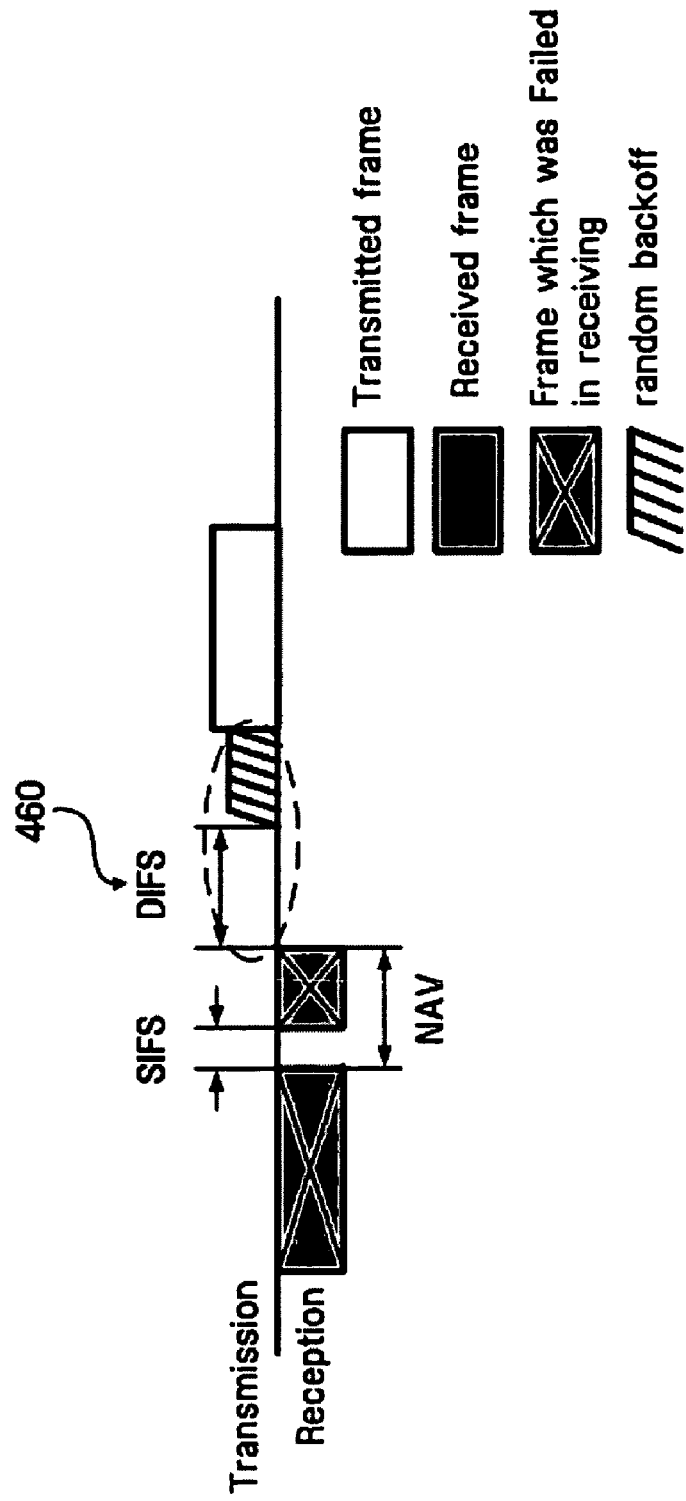

FIG. 6

| Data rate (Mbits/s) 610 | Modulation 620 | Coding rate (R) 630 | Coded bits per subcarrier ($N_{BPSC}$) 640 | Coded bits per OFDM symbol ($N_{CBPS}$) 650 | Data bits per OFDM symbol ($N_{DBPS}$) 660 |
|---|---|---|---|---|---|
| 6 | BPSK | 1/2 | 1 | 48 | 24 |
| 9 | BPSK | 3/4 | 1 | 48 | 36 |
| 12 | QPSK | 1/2 | 2 | 96 | 48 |
| 18 | QPSK | 3/4 | 2 | 96 | 72 |
| 24 | 16-QAM | 1/2 | 4 | 192 | 96 |
| 36 | 16-QAM | 3/4 | 4 | 192 | 144 |
| 48 | 64-QAM | 2/3 | 6 | 288 | 192 |
| 54 | 64-QAM | 3/4 | 6 | 288 | 216 |

PLCP reception procedure

PLCP reception procedure

METHOD AND APPARATUS FOR SETTING, TRANSMITTING AND RECEIVING DATA FOR VIRTUAL CARRIER SENSING IN WIRELESS NETWORK COMMUNICATION

CROSS-REFERENCE TO RELATED APPLICATIONS

This application is based on and claims foreign priority under 35 USC §119 from Korean Patent Application No. 10-2004-0004697 and 10-2004-0084405 filed on Jan. 26, 2004 and Oct. 21, 2004, respectively, with the Korean Intellectual Property Office, the disclosures of which are incorporated in their entirety by reference.

BACKGROUND OF THE INVENTION

1. Field of Invention

The present invention relates to a wireless network communications method, and more particularly, to virtual carrier sensing in a communications network using various data transmission rates, and a wireless communications method using the same.

2. Description of the Related Art

Recently, there is an increasing demand for ultra high-speed communication networks due to widespread public use of the Internet and a rapid increase of multimedia data. Since local area networks (LAN) emerged in the late 1980s, the data transmission rate over the Internet has drastically increased from about 1 Mbps to about 100 Mbps today. Thus, high-speed Ethernet transmission has gained popularity and wide spread use nowadays. Up to now, intensive research in the area of gigabit-speed Ethernet has been ongoing. An increasing interest in wireless network connections and communications has triggered research and implementation of wireless local area networks (WLAN). Now, there is an increasing availability of the WLAN to consumers. Although use of WLAN may be obstructed due to performance deterioration in terms of lower transmission rates and poorer stability compared to wired LAN, WLAN has various advantages, including wireless networking capability, greater mobility and so on. Accordingly, markets of the WLAN have been growing.

Due to the need for a greater transmission rates and the development of wireless transmission technology, the initial IEEE 802.11 standard, which specifies a 1-2 Mbps transfer rate, has evolved into more advanced standards including 802.11b, 802.11g and 802.11a. Recently, conferences for establishing the new IEEE standard, 802.11g have been held. The IEEE 802.11a standard, which specifies a 6-54 Mbps transmission rate in the 5 GHz-National Information Infrastructure (NII) band, uses orthogonal frequency division multiplexing (OFDM) as transmission technology. With an increasing public interest in OFDM transmission and use of 5 GHz band, much greater attention has been paid to the IEEE 802.11a than other wireless LAN standards.

Recently, wireless Internet services using WLAN, so-called "Nespot", have been launched and offered by Korea Telecommunication (KT) Corporation, Korea. Nespot service provides access to the Internet using a WLAN according to IEEE 802.11b, commonly called Wi-Fi representing wireless fidelity. Communication standards for wireless data communication systems, which have been completed and promulgated or have been under research and discussion, include WCDMA (Wide Code Division Multiple Access), IEEE 802.11x, Bluetooth, IEEE 802.15.3, etc. known as 3G (3rd generation) communication standards. The most widely known, cheapest wireless data communication standard is IEEE 802.11b, a series of IEEE 802.11x. An IEEE 802.11b WLAN standard provides data transmission at a maximum rate of 11 Mbps and utilizes the 2.4 GHz-Industrial, Scientific, and Medical (ISM) band, which can be used under a predetermined electric field without permission. With the recent widespread use of the IEEE 802.11a as WLAN, which provides a maximum data rate of 54 Mbps in the 5 GHz band by using OFDM, IEEE 802.11g developed as an extension to the IEEE 802.11n for MIMO (multiple input multiple output) is being researched intensively.

The Ethernet and the WLAN, which are currently being widely used, both utilize a carrier sensing multiple access (CSMA) method. The CSMA method is used to determine whether a channel is in use or not. When it is determined that the channel is not in use, that is, when the channel is idle, then data is transmitted. If the channel is busy, retransmission of data is attempted after a predetermined period of time. A carrier sensing multiple access with collision detection (CSMA/CD) method is an improvement of the CSMA method, which is used in a wired LAN, whereas a carrier sensing multiple access with collision avoidance (CSMA/CA) method is used in packet-based wireless data communications. In the CSMA/CD method, a station suspends transmitting signals when a collision is detected during transmission. Unlike the CSMA method which pre-checks whether a channel is occupied or not before transmitting data, in the CSMA/CD method, the station suspends transmission of signals when a collision is detected during the transmission of signals and transmits a jam signal to another station to inform the occurrence of the collision. After the transmission of the jam signal, the station must wait for a random backoff period and then restarts transmitting signals. In the CSMA/CA method, the station does not transmit data immediately after the channel becomes idle but must wait for a random backoff period after a predetermined duration before transmission to avoid collision of signals. If a collision of signals occurs during transmission, the duration of the random backoff period is increased twofold for lowering the probability of collision (interference).

FIGS. 1A and 1B illustrate a conventional process of transmitting and receiving a frame in a contention period. A frame is received in a station under the assumption that the received frame has been transmitted to another station as a receiving station.

First, referring to FIG. 1A, a frame transmitted through a channel is received by a station without error. A station cannot transmit a frame through a channel while the frame is being received in another station: this method is referred to as physical carrier sensing. A medium access control (MAC) header of the received frame contains duration information. This duration information contains a duration of time taken from transmission of a frame by a transmitting station to reception of an acknowledge (ACK) frame from a receiving station. The receiving station receives the frame transmitted from the transmitting station and transmits the ACK frame after a short duration, known as a short inter-frame space (SIFS), to the transmitting station. A station sets a network allocation vector (NAV) using duration information, This method is called virtual carrier sensing. In order for a station to transmit a frame to another station, the station waits for a distributed inter-frame space (DIFS) after the lapse of an NAV period of time, and then performs a random backoff, and finally transmits the frame. When a carrier is sensed in a medium while performing the random backoff, however, the station suspends the random backoff, and waits until the channel is empty. Then, the station waits for a DIFS, and performs the random backoff.

Referring to FIG. 1B, a station cannot receive a frame transmitted through a channel. A station cannot utilize a channel while a frame is being transmitted through the channel, which is called physical carrier sensing. When a frame transmitted through a channel cannot be received due to the occurrence of an error, the station cannot set an NAV value because the NAV value is provided as information loaded in the frame. Thus, before transmission of a frame, the station that is unable to set an NAV value must wait for the duration of an extended inter-frame space (EIFS), which is longer than a DIFS, and then perform a random backoff. In FIG. 1B, when the channel becomes idle due to a failure in receiving a frame, the station waits for an EIFS. An ACK frame corresponding to the frame is transmitted through the channel before the EIFS, that is, immediately after an SIFS. If the station cannot receive even the ACK frame, the station must wait for another EIFS which starts after duration of ACK frame and finally performs a random backoff when a channel is idle, so as to transmit the frame. In other words, when the station cannot perform a virtual carrier sensing because of failure in obtaining a NAV value, the station has to wait longer than when the frame is received with no error. Because of this, the probability of the station losing in the contention of frame transmission would increase, thereby adversely affecting data transmission efficiency. Occurrence of such an error may be more distinguishable in a communication environment in which various modulation schemes and coding rates are used, like in IEEE 802.11a communications. In other words, when frames are transmitted to a station at a rate which is not supported by the station, the station cannot interpret the transmitted frame so that duration information cannot be obtained from an MAC header of the frame. Consequently, virtual carrier sensing from a frame transmitted at a rate not available for reception by a station cannot be achieved, resulting in deterioration of station performance.

In more detail, problems associated with conventional virtual carrier sensing will be described with reference to FIGS. 1A and 1B.

Unlike physical carrier sensing, virtual carrier sensing (VCS) assumes that a medium is occupied for a predetermined duration. Whereas physical carrier sensing is achieved based on measurement of actual wireless media, virtual carrier sensing is performed such that a predetermined value selected among received/transmitted data is set, duration of a medium occupation is estimated using the selected predetermined value, and transmission of data is then started after the estimated duration has elapsed. That is, unlike physical carrier sensing, virtual carrier sensing cannot be properly performed when data is not successfully received. In a normal virtual carrier sensing operation, as shown in FIG. 1A, when a network allocation vector (NAV), as information necessary for virtual carrier sensing, is received normally, it is possible to identify how long the medium will be occupied (busy), by reading the NAV value. On the other hand, when an error occurs, that is, when there is an error in reading a received frame, as shown in FIG. 1B, a NAV value cannot be read from the frame. Thus, the station has to wait for longer than a NAV period, for instance, an EIFS (Extended Inter-Frame Space) according to IEEE 801.11a.

Now, the reasons why the problems stated above have been generated will be described with reference to FIG. 2.

FIG. 2 illustrates conventional carrier sensing, supporting two kinds of carrier sensing structures: physical carrier sensing and virtual carrier sensing. As to a physical sensing structure, information stored in a physical layer 210 has a structure 212. A physical layer convergence procedure (PLCP) preamble 214 is a PLCP synchronization signal for the purpose of informing in advance which data in the physical layer 210 will be transmitted. A signal 216, as indicated by SIGNAL, is preceded by the PLCP preamble 214, and SIGNAL is modulated by a basic modulation scheme, and carries information which is necessary to receive a next data field 218, as indicated by DATA. The SIGNAL 216 will later be described in detail with reference to FIGS. 5A-C. Information contained in the SIGNAL 216 has a segment, as indicated by RATE, corresponding to a modulation scheme used in transmission of the DATA 218. This information enables data transmission/reception using various modulation schemes. As shown in FIG. 2, physical carrier sensing is implemented based on whether the medium receives a certain signal or not. Upon receiving the PLCP preamble 214, the physical layer 210 informs a medium access control (MAC) layer 220 that the physical layer 210 is busy, through a busy signal 222. Also, at an instant when the reception of data is terminated, that is, when the channel becomes idle as indicated by reference numeral 228, the physical layer 210 informs the MAC layer 220 that the use of the physical layer 210 is terminated. In the physical carrier sensing, however, transmitting data to an arbitrary station may not be accepted by another station. In this case, it is necessary to perform virtual carrier sensing. In virtual carrier sensing, a duration (NAV) value in an MPDU of the DATA 218 is read by the MAC layer 220 to recognize whether the medium is busy for a corresponding duration. Here, the MPDU, which is an abbreviation for MAC Protocol Data Unit, refers to data adopted by an MAC to transmit it to another MAC connected to the network. However, the NAV value can be read only when a data field is received normally. Therefore, if a receiving station is only able to receive a signal field but is not able to read the data field modulated using various schemes, a NAV value set in the data field cannot be read.

What is needed is a communication method capable of improving the performance of a station by ensuring virtual channel sensing using frames transmitted at various rates.

SUMMARY OF THE INVENTION

The present invention has been proposed according to the needs described above. An aspect of the present invention is to provide a virtual carrier sensing method in wireless network communications supporting various rates and a wireless communications method using the same.

Another aspect of the present invention provides a virtual carrier sensing method in MIMO communications and a wireless communication method and apparatus using the same.

According to an exemplary embodiment of the present invention, there is provided a method of setting virtual carrier sensing data in wireless network communications, the method comprising receiving a frame transmitted using various modulation schemes and extracting data for virtual carrier sensing from a modulated segment of the frame based on a basic modulation scheme, and setting virtual carrier sensing using the extracted data.

Preferably, in the receiving of the frame, the modulation scheme used comprises orthogonal frequency division multiplexing.

In the receiving of the frame, the data for virtual carrier sensing is preferably added in the modulated segment of the frame based on the basic modulation scheme having a data rate which is supported by any station, preceded by a synchronization signal.

The extracting of the data is preferably performed after checking whether there is an error in the modulated segment of the frame based on the basic modulation scheme.

The setting of virtual carrier sensing data may comprise transmitting the data to a physical layer.

The method of setting virtual carrier sensing data in wireless network communications may further comprise storing the data as a parameter of a vector of a physical layer virtual carrier sensing indicator (PHY-RXSTART.indicator) and transmitting the same to the physical layer. The NAV value stored in a signal segment is also stored in a data segment to be received in a next stage. In other words, the same NAV value in the data segment is stored in the signal segment.

BRIEF DESCRIPTION OF THE DRAWINGS

The above and other features and advantages of the present invention will become more apparent by describing in detail exemplary embodiments thereof with reference to the attached drawings in which:

FIGS. 4A through 4C illustrate conventional virtual carrier sensing and virtual carrier sensing according to an exemplary embodiment of the present invention;

FIG. 6 shows a table of information concerning modulation schemes in an IEEE 802.11a wireless network communication;

DETAILED DESCRIPTION OF THE INVENTION

The present invention is described below in the context of orthogonal frequency division multiplexing (OFDM) modulation via IEEE 802.11a WLAN communication. However, it is to be appreciated that the teachings of the invention discussed herein are not so limited. That is, the invention is applicable to any wireless communication system using various modulation schemes.

Figure 3:
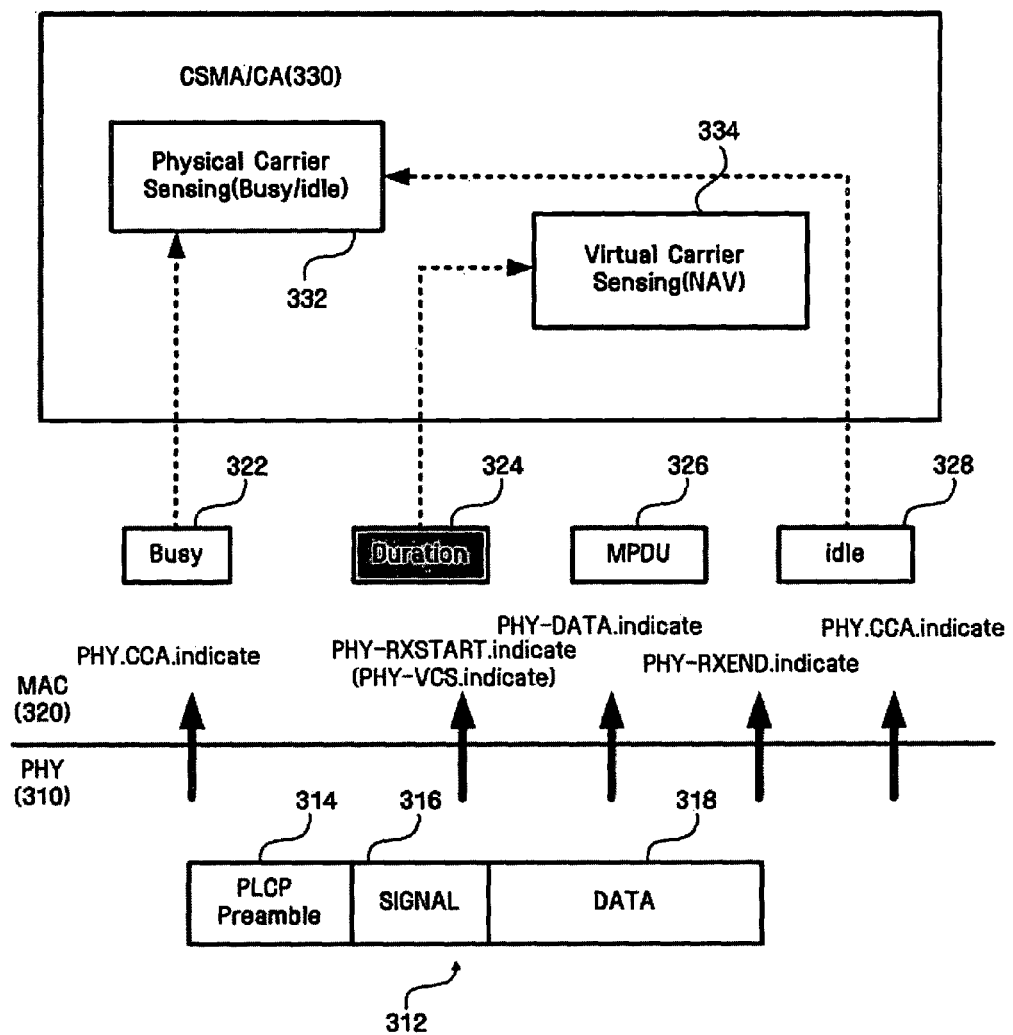
FIG. 3 illustrates a method of transmitting data for virtual carrier sensing according to an exemplary embodiment of the present invention.

To address a solution for delay problems caused by the conventional virtual carrier sensing technology, the present invention proposes a new virtual carrier sensing method, which will now be described with reference to FIG. 3. As described above, in order for all the stations to establish their respective NAVs, duration information 324 is included in a signal that is transmitted by a basic modulation scheme. Therefore, a physical layer 310 can transmit the NAV (duration) value 324 to a MAC layer 320. "PHY-RXSTART.indicate", which provides information concerning the reception of the NAV value from the physical layer 310 by the MAC layer 320, may have a vector value. To this end, previous vector values must be changed, which will be described later with reference to FIGS. 8 and 10.

As in the conventional method, the NAV value may also be stored in a data field. According to the present invention, the NAV value can be transmitted regardless of the reception rate of a station, even in a wireless network communication environment using various modulation schemes.

FIGS. 4A through 4C illustrate a virtual carrier sensing method according to an exemplary embodiment of the present invention, in which the NAV value can be read even when a continuing frame is not received.

Figure 1A:
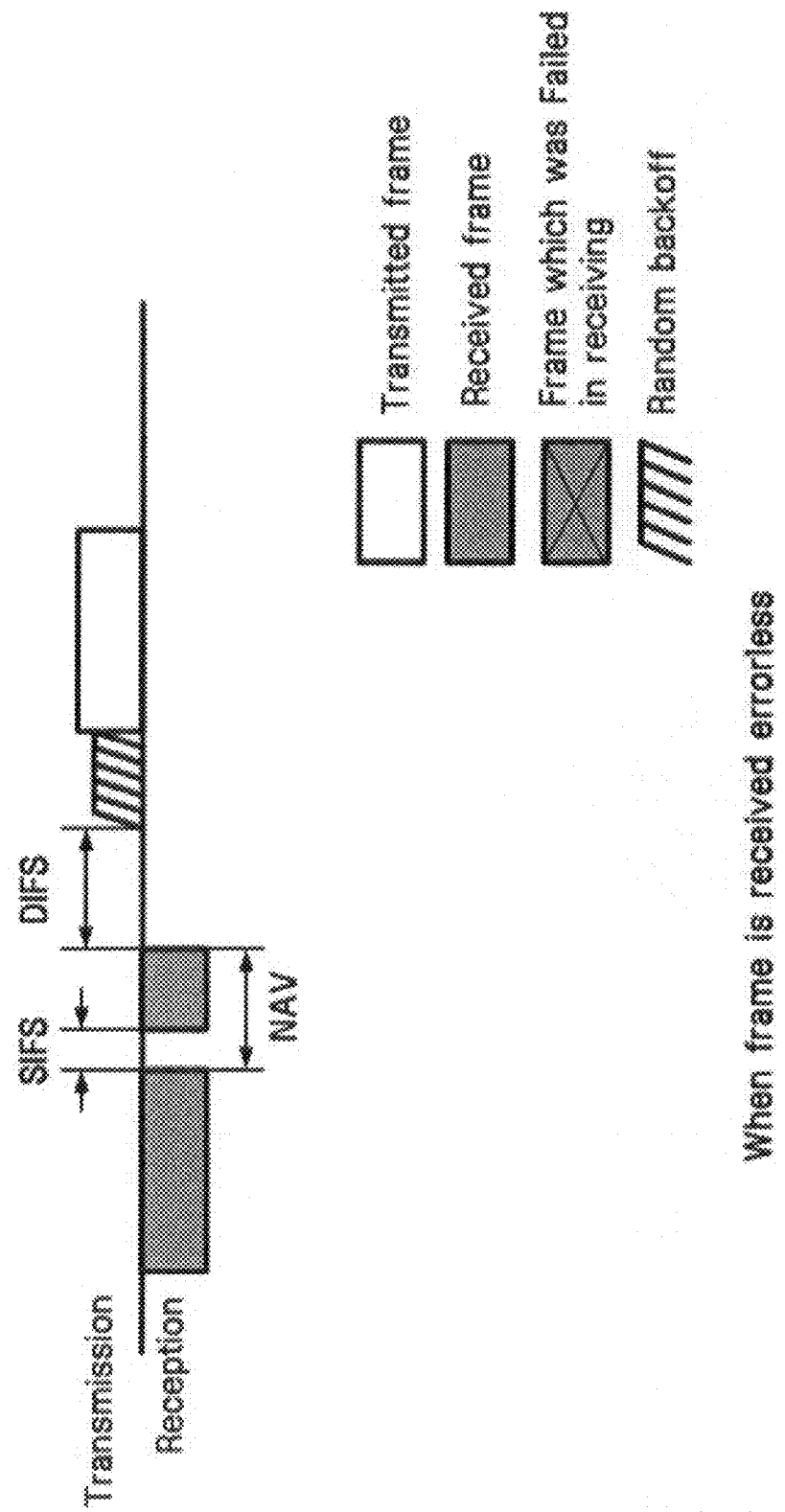
FIGS. 1A and 1B illustrate conventional processes of transmitting and receiving a frame in a contention period.
Figure 1B:
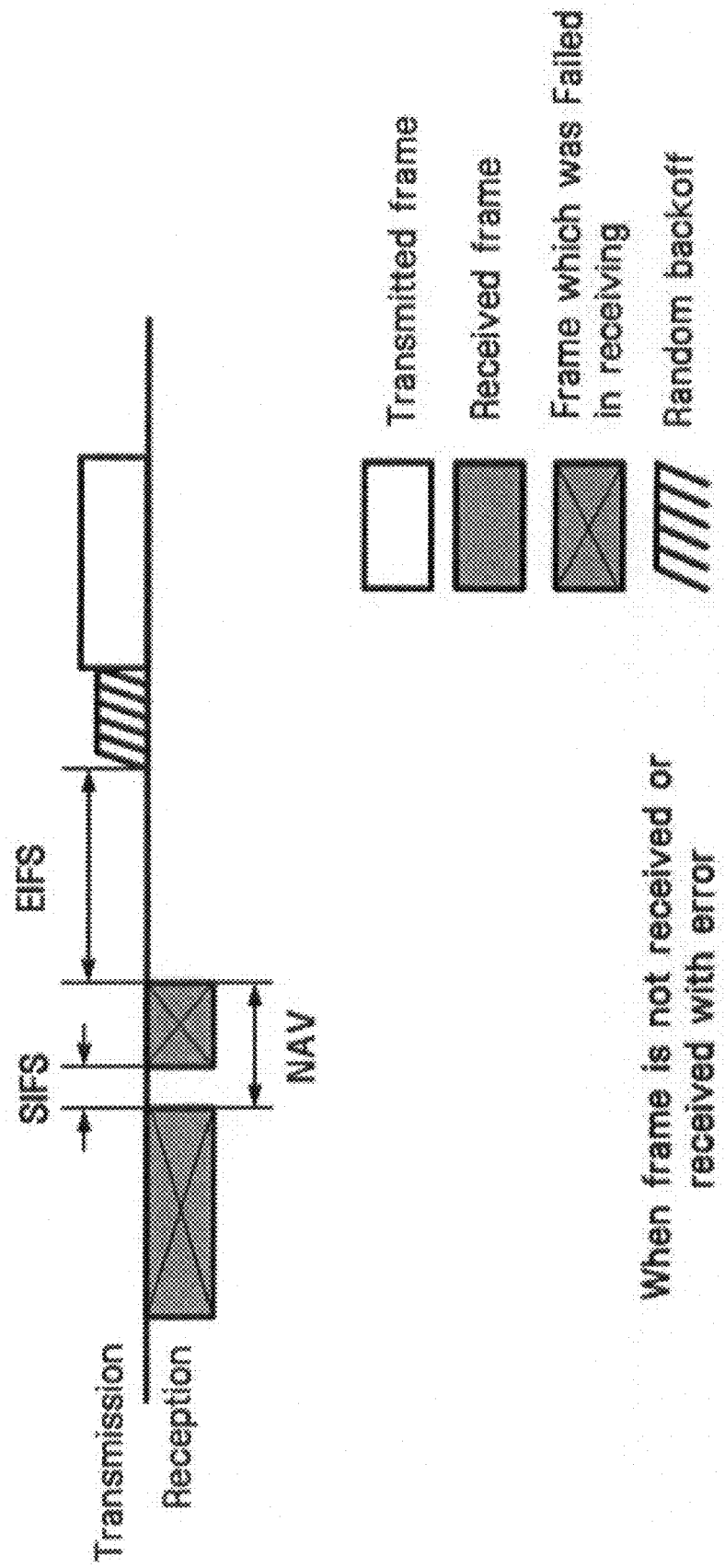
Figure 2:
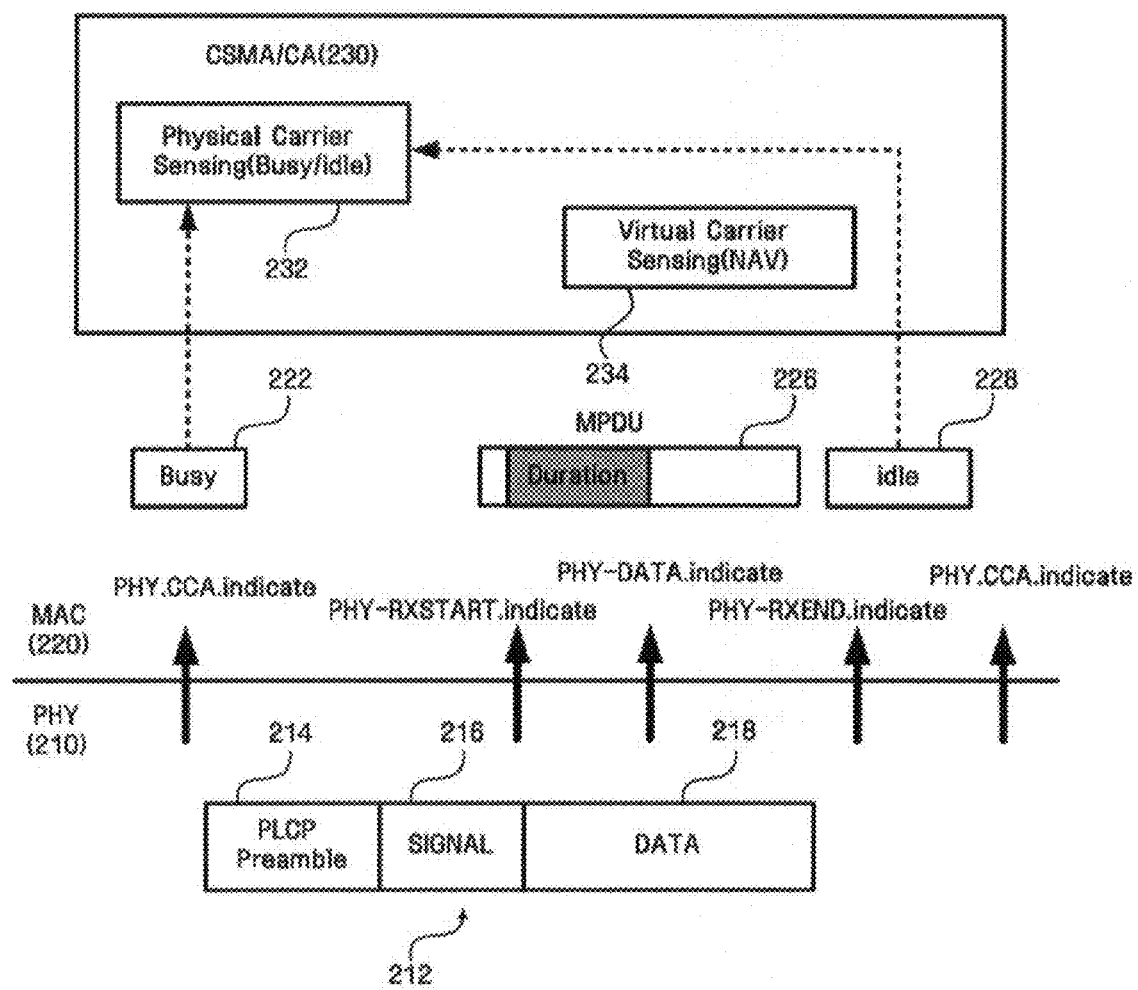
FIG. 2 illustrates exemplary conventional physical carrier sensing and virtual carrier sensing structures and corresponding frame formats.

In detail, FIG. 4A illustrates that a frame is received normally by a receiving station. When reception of the frame is terminated, a station can read a NAV value from the received frame, and the station then waits for a NAV duration time 450 for virtual carrier sensing. After lapse of a Distributed Inter-Frame Space (DIFS) period 420 and a random backoff period 440, the next frame can be transmitted. In some cases, where a receiving station does not support a proper data reception rate, a frame cannot be received by the receiving station and an NAV value cannot be read from the frame, as shown in FIG. 4B. In such a case, the receiving station must wait for an Extended Inter-Frame Space (EIFS) period 430, which is longer than the duration corresponding to the NAV value. Then, after the lapse of a random backoff period, data can be transmitted, which has already been described with reference to FIG. 1.

In the present invention, data not received by a station, is described with reference to FIG. 4C. Although data cannot be received by the receiving station, data transmission can be performed after the lapse of a NAV period and a DIFS period 460, as shown in FIG. 4C. The NAV period is obtained from a known NAV value stored in a signal segment. As a result, a standby period of time due to a reception error can be shortened.

Figure 5A:
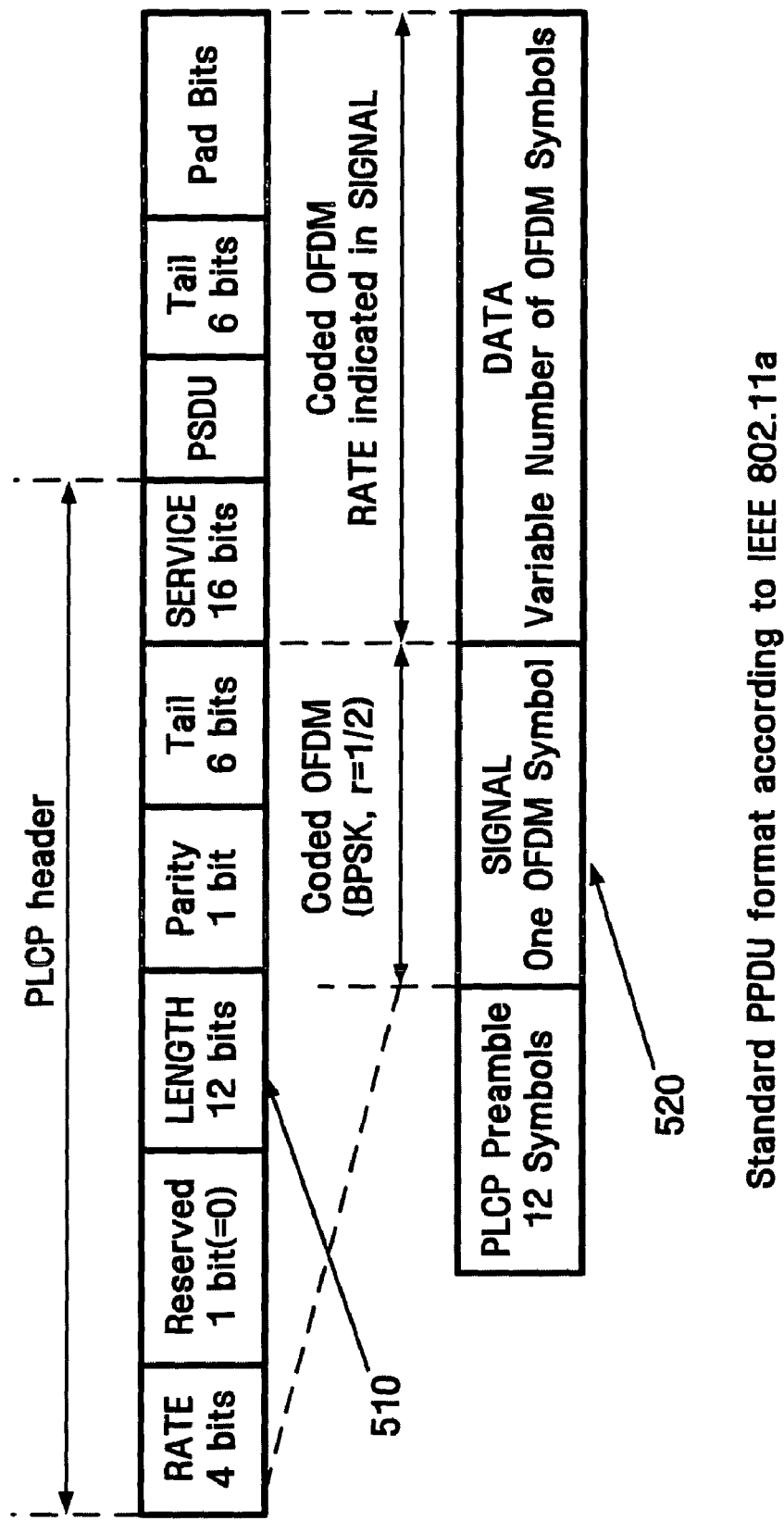
FIGS. 5A through 5C illustrate conventional PPDU (PLCP Protocol Data Unit) frame format as defined by IEEE 802.11a, and exemplary modified PPDU frame formats according to the present invention.
Figure 5B:
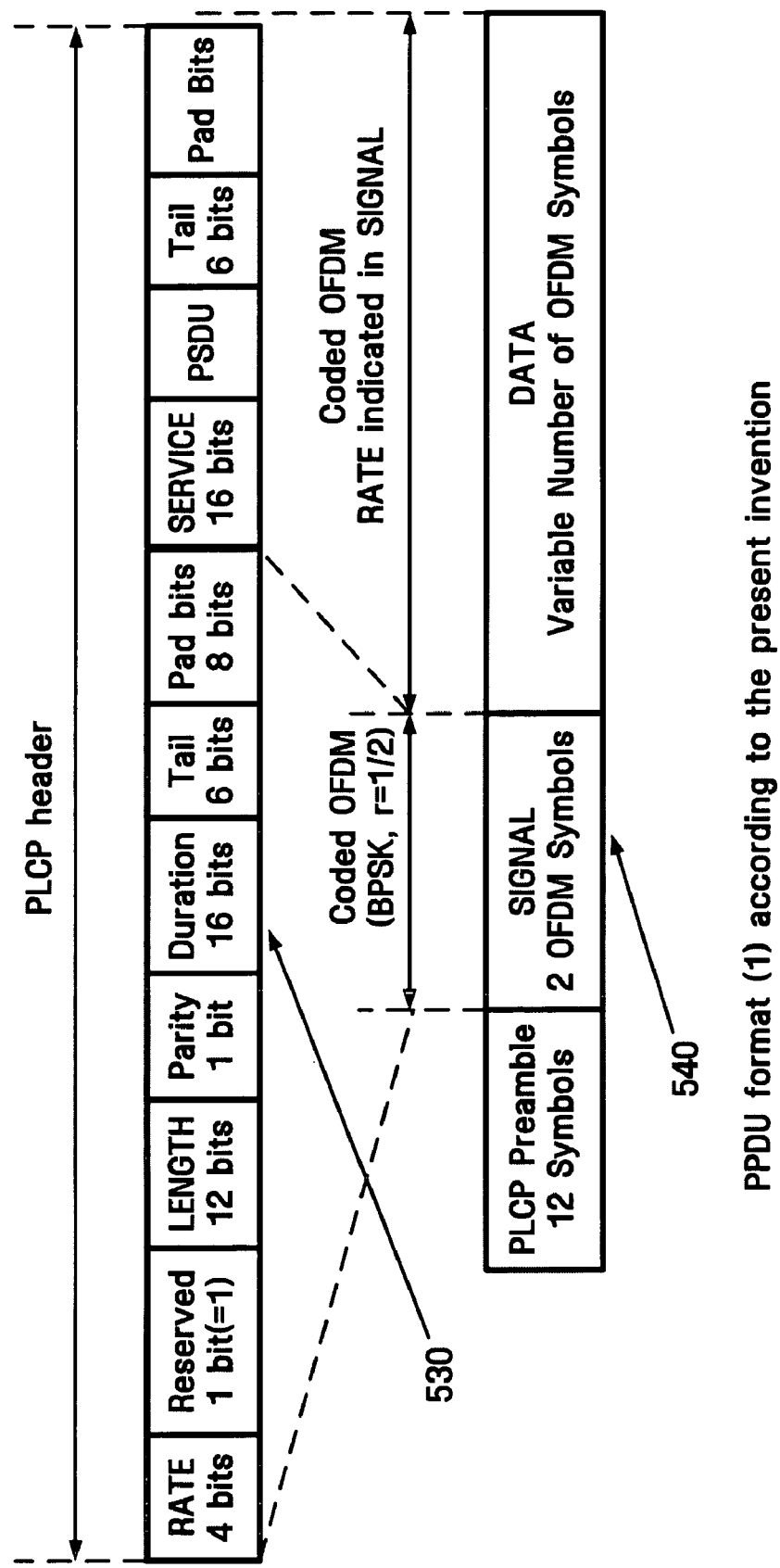
Figure 5C:
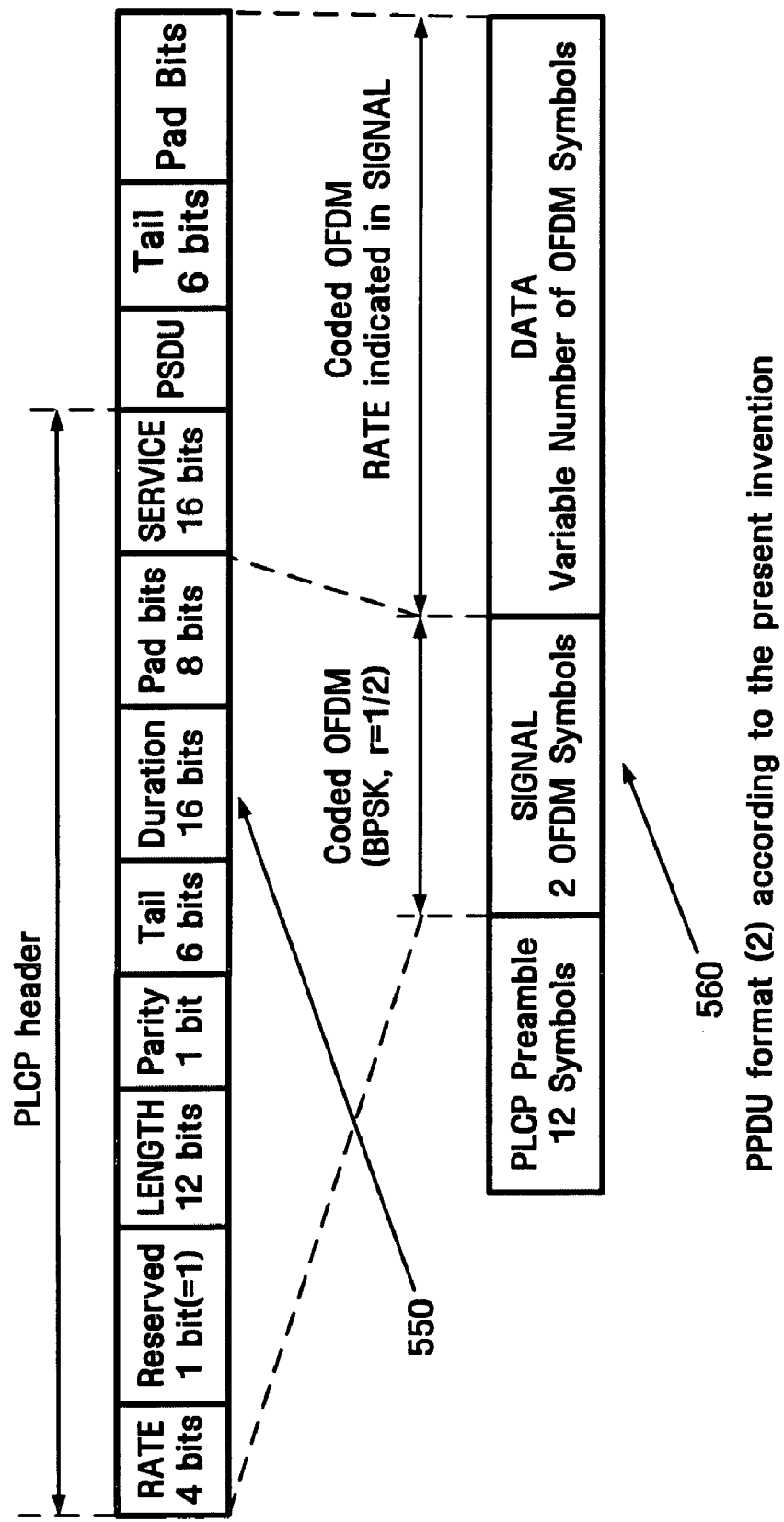

FIGS. 5A through 5C illustrate a conventional PPDU (PLCP Protocol Data Unit) frame format as defined by IEEE 802.11a, and exemplary modified PPDU formats for embodying the present invention. The PPDU is a complete PLCP (Physical Layer Convergence Procedure) frame, including a PLCP header, a PSDU, tail bits and pad bits. First of all, PLCP will be described briefly. A relatively complicated physical (PHY) layer is required when using radio waves therein. A physical layer according to IEEE 802.11a includes a PLCP and a PDM (Physical Medium Dependent) system. The PLCP, which is a upper layer portion of the physical layer in an IEEE 802.11 network, matches a frame of a MAC layer with a medium. Each physical layer has its own PLCP, which provides an auxiliary frame to the MAC layer. The PMD system is responsible for transmitting a radio frequency (RF) signal to another station in order to transmit the frame of the MAC layer. The PLCP header according to an illustrative embodiment of the present invention stores basic information required for interaction between the PHY layer and the MAC layer.

A conventional frame format will now be briefly described. The SIGNAL shown in FIG. 5A is modulated by basic modulation scheme, i.e., binary phase shift keying (BPSK) with r=½, and transmitted as one OFDM symbol, as denoted by 520. The reason of using the basic modulation scheme is to allow any station to read the SIGNAL because the SIGNAL provides information quite important for the following frame to be received. Information stored in the SIGNAL (one OFDM symbol) 520 includes RATE of 4 bits, i.e., a modulation rate for reading data to be applied in a next stage, Reserved of 1 bit, LENGTH 510 of 12 bits, and Tail of 6 bits. A field of service bits, denoted by SERVICE, is included in the PLCP header but is carried in combination with the DATA because of a characteristic of BPSK-based OFDM symbol, that is, only 24 bits are transmitted by the OFDM symbol. Data rate, coding rate, and data bits per OFDM symbol, including a basic modulation scheme, BPSK with R=½, are shown in FIG. 6, as indicated by reference numerals 610, 630 and 660, respectively. The SIGNAL is transmitted at the lowest coding rate of 6 Mbit/s (610 shown in FIG. 6), and a total of 24 data bits per symbol can be transmitted at the lowest coding rate, that is, R=½, which allows all stations to read the SIGNAL. The coding rate (R) 630 refers to a ratio between bits carrying information for error checking and bits carrying information to be actually transmitted. The half of a total of 48 coded bits per OFDM symbol, i.e., 24 bits, is transmitted as actual data, as indicated by reference numeral 660.

According to exemplary frame formats of the present invention, as shown in FIGS. 5B and 5C, each signal field, as indicated by SIGNAL, includes two OFDM symbols, which is for storing the above-described NAV value therein. Also, for the compatibility with conventional protocols, a reserved field is set to one bit for transmission. The number of duration bits (duration information) 530, 550 is set to be equal to the NAV value stored in the DATA. Also, the SIGNAL is transmitted as two symbols, indicated by reference numerals 540 and 560, whereon one of the two symbols is for storing the duration information. Therefore, when using BPSK with r=½, by which a total of 24 data bits per symbol can be transmitted, a total of 48 data bits can be transmitted using the frame formats shown in FIGS. 5B and 5C, with the addition of 8 pad bits. When using other wireless communications protocols, a NAV value may be added. According to conditions of various embodiments of the present invention, the NAV value may be stored in the DATA, which is modulated using the basic modulation scheme, or in both the DATA and SIGNAL.

As described above, a NAV value may be established by modifying a structure of the conventional PPDU frame. It is also possible to establish a NAV value with the conventional IEEE802.11a standard PPDU frame format (FIG. 5A). This will be described with reference to FIG. 11.

Setting a NAV value, i.e. duration information, in a signal using a basic modulation scheme in transmitting and receiving stations will now be described.

Figure 7:
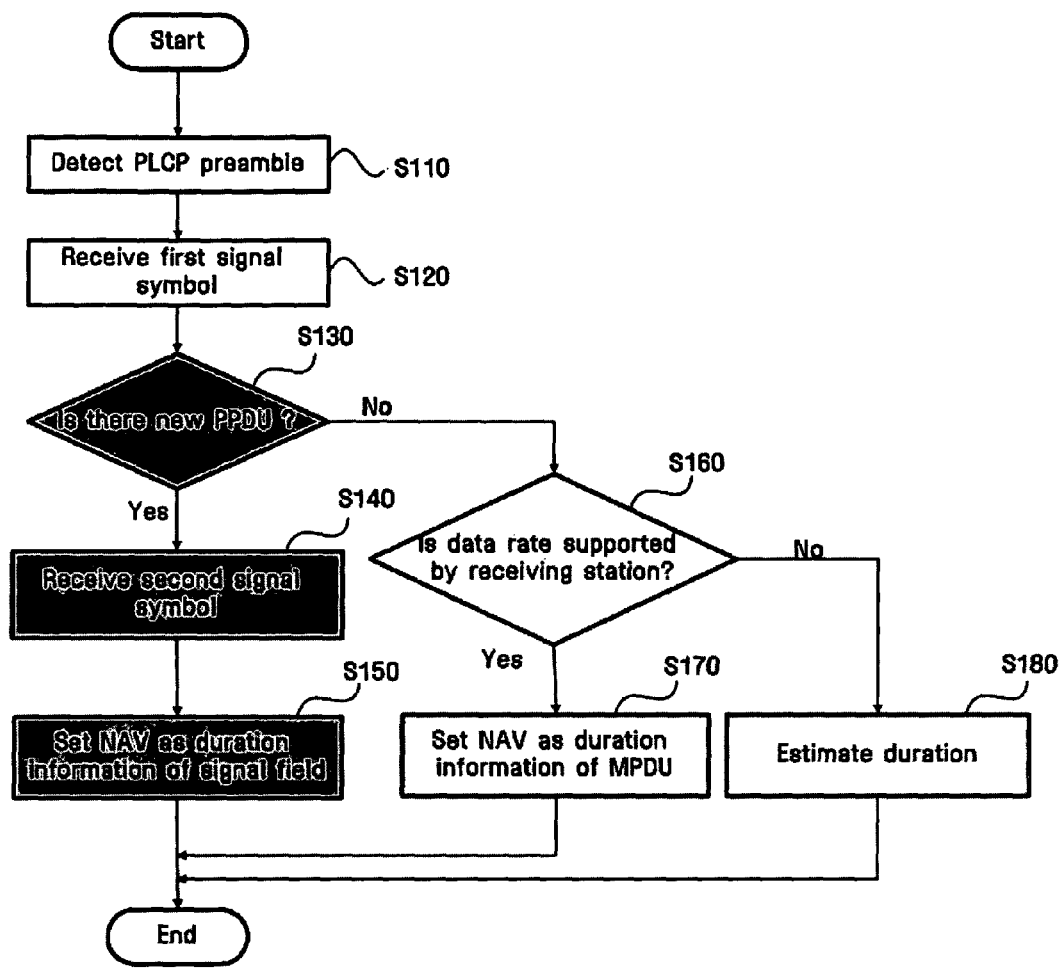
FIG. 7 is a flowchart illustrating a virtual carrier sensing procedure according to an exemplary embodiment of the present invention.

FIG. 7 is a flowchart illustrating a virtual carrier sensing procedure in a receiving station. Referring to FIG. 7, a particular signal, i.e., a PLCP preamble, as shown in FIGS. 5A-5C, which is indicative of the reception of information by the receiving station through a wireless medium, is detected in step S110, and next basic information, i.e., a first signal symbol, is received at a receiver side, i.e., the receiving station, in step S120. In this case, a particular field of reserved bits of the basic information is separately provided such that the number of reserved bits of a symbol is set to one (1), by which transmission of new data is indicated, and NAV value information is extracted from information transmitted using a basic modulation scheme. In step S130, it is determined whether there is a new PPDU. The parity bit is checked to determine whether the received data is correct. It is determined whether a frame received through the above processes is based on a new modulation scheme. If it is determined that the frame is not based on a new modulation scheme, the frame is determined to be based on a conventional scheme and then processed by the conventional scheme. In this case, it is determined whether a data rate is supported by the receiving station in step S160. If a data rate is supported by the receiving station, the following symbols are received at the data rate and a NAV value is read from the symbols in step S170. However, if the data rate is not supported by the receiving station, a NAV value cannot be read, so that a duration of EIFS, rather than the NAV value, is awaited in step S180. In step S130, if it is determined that there is a new PPDU, a second signal symbol is received in step S140. Then, a NAV value read from the signal symbol is set as a duration value of a signal field in step S150. That is, regardless of the reception capacity of the receiving station, the NAV value can be obtained from the SIGNAL. Accordingly, the reception station can transmit data immediately after the NAV duration, regardless of its supported data rate range in FIG. 7.

Steps S130, S140 and S150 shown in FIG. 7 represent an exemplary embodiment of the present invention, as defined by IEEE 802.11a. In this case, regardless of the normal reception of the frame, the NAV value can be accurately read without an error.

Figure 8:
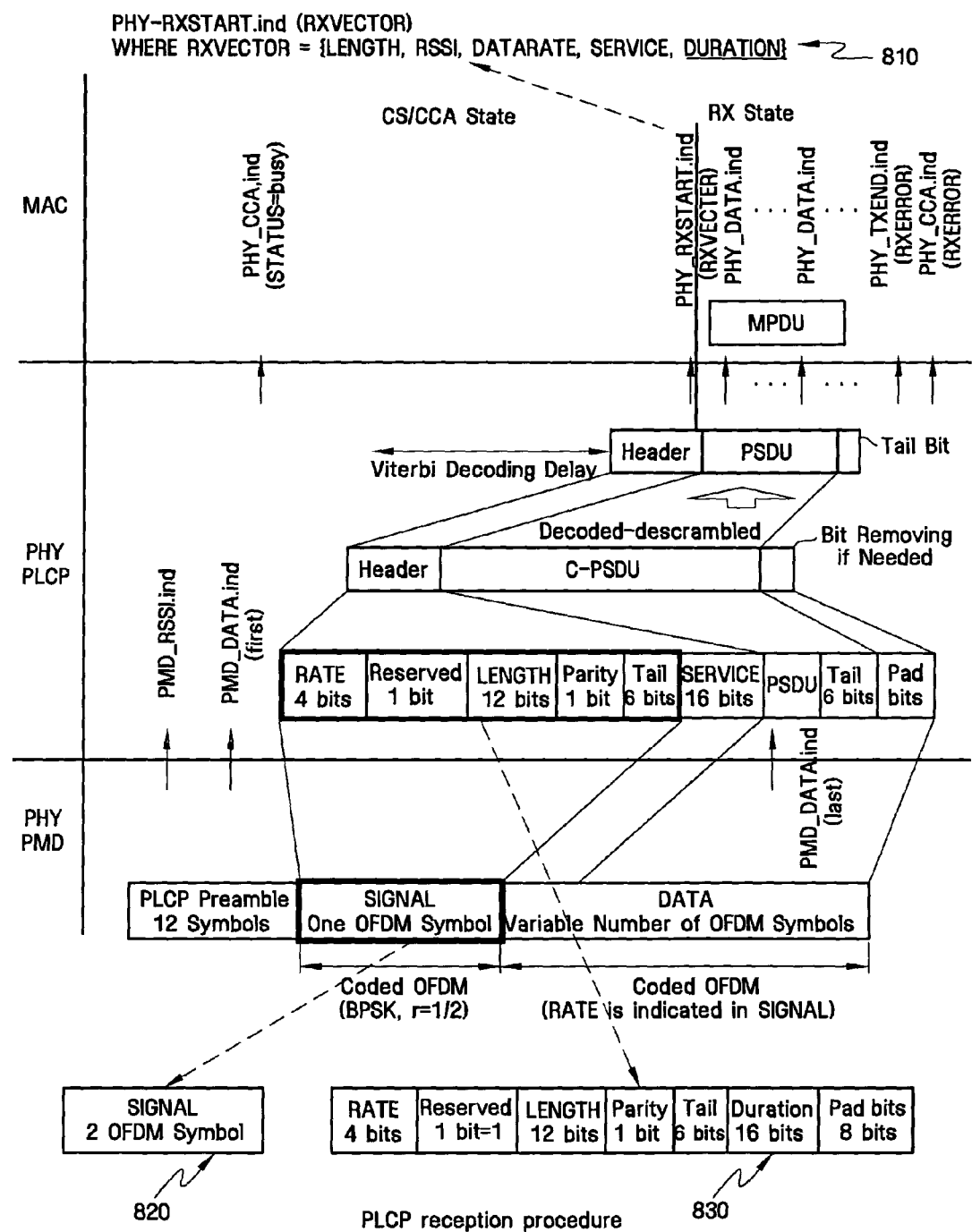
FIG. 8 illustrates a difference between a conventional signal reception procedure and a PLCP reception procedure according to the present invention.

When virtual carrier sensing according to the present invention is achieved, each station waits to transmit data until the lapse of an NAV period and a DIFS period, and the station can transmit data after channel contention like a contention window, which is shown in FIG. 8. FIG. 8 illustrates differences between a conventional signal reception procedure, as defined by IEEE 802.11a, by way of example, and a PLCP reception procedure according to the present invention. In detail, unlike in the conventional procedure in which a signal of one (1) OFDM symbol is received, in the present invention, a signal of 2 OFDM symbols is received, as indicated by reference numeral 820. The same format of the SIGNAL 560 as shown in FIG. 5C, that is, 2 OFDM symbols, is also applied to the case of the present invention, as indicated by reference numeral 830 in FIG. 8. To transmit a NAV value obtained from the SIGNAL to an MAC layer from a PHY layer, the vector value is corrected, as indicated by reference numeral 810, as follows:

PHY-RXSTART.ind (RXVECTOR)

where RXVECTOR={LENGTH, RSSI, DATARATE, SERVICE, <u>DURATION</u>}

In other words, to transmit the NAV (DURATION) value, obtained from the symbol of the PHY layer, to the MAC layer, the conventional RXVECTOR values are corrected.

Figure 9:
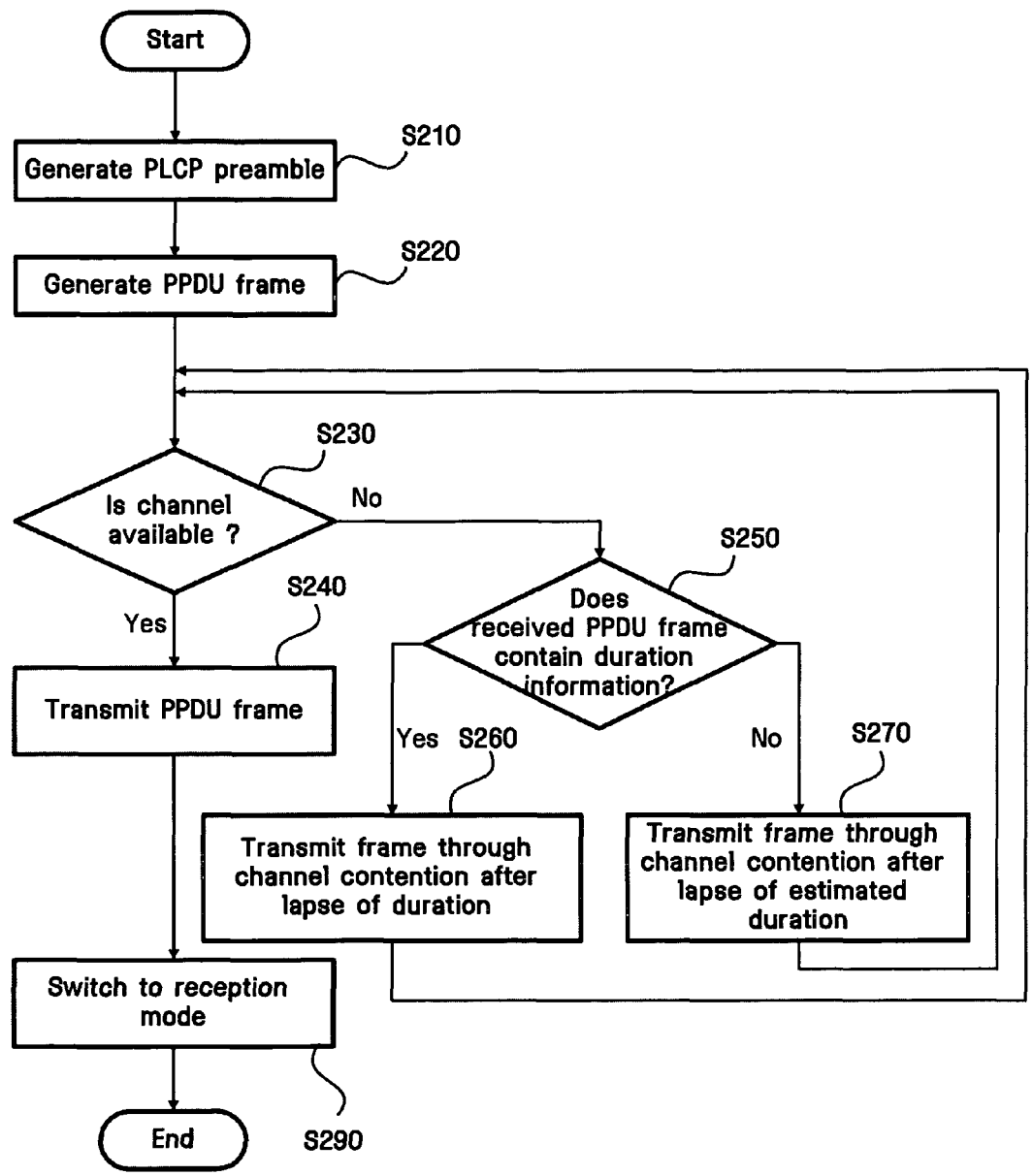
FIG. 9 is a flowchart illustrating the data transmission procedure according to an exemplary embodiment of the present invention.

FIG. 9 shows an example of the transmission of a frame for a new virtual carrier sensing featuring where a NAV value is stored in a field corresponding to the PLCP header in the conventional transmission method. A PLCP preamble is generated in step S210, and a PPDU frame including the PLCP preamble is generated in step S220. In order to generate the PPDU frame in step S220, it is necessary to set the number of reserved bits to 1 and to set parity bits for error checking in the data to be transmitted. In step S230, a station examines whether a channel is available. If it is determined that a channel is available, the PPDU frame is transmitted in step S240, and the mode is switched to a reception mode in step S290. However, if it is determined in step S240 that a channel is busy, it is determined whether a previously received PPDU frame includes duration information, i.e., a NAV value, in step S250. If the previously received PPDU frame includes the NAV value, the frame is transmitted through channel contention after the lapse of a duration corresponding to the NAV value, in step S260. Otherwise, the frame is transmitted through channel contention after the lapse of an estimated EIFS, in step S270.

Figure 10:
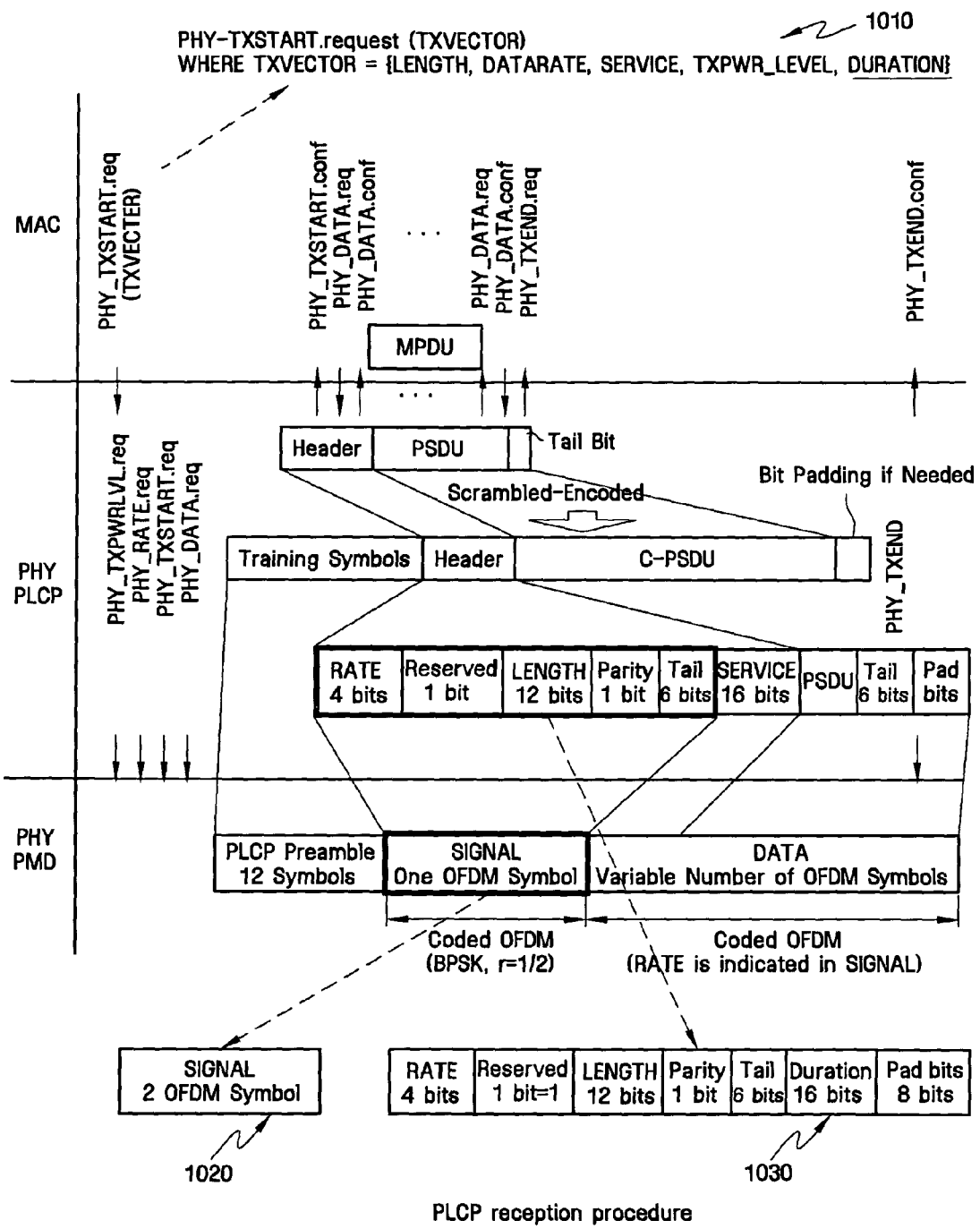
FIG. 10 illustrates a difference between the conventional signal transmission procedure and a transmission procedure according to the present invention.

Information exchange between the MAC layer and the PHY layer for frame transmission is shown in FIG. 10. To transmit the NAV (DURATION) value generated in the MAC layer to the physical layer, the following correction, as indicated by reference numeral 1010, is performed:

PHY-TXSTART.request (TXVECTOR)

where TXVECTOR={LENGTH, DATARATE, SERVICE, TXPWR_LEVEL, <u>DURATION</u>}

The transmitted DURATION value is carried by a signal of 2 OFDM symbols 1020, as described above, and as indicated by reference numeral 1030. The same frame format of the SIGNAL 560, as shown in FIG. 5C, is also applied to the illustrative embodiment.

Figure 11:
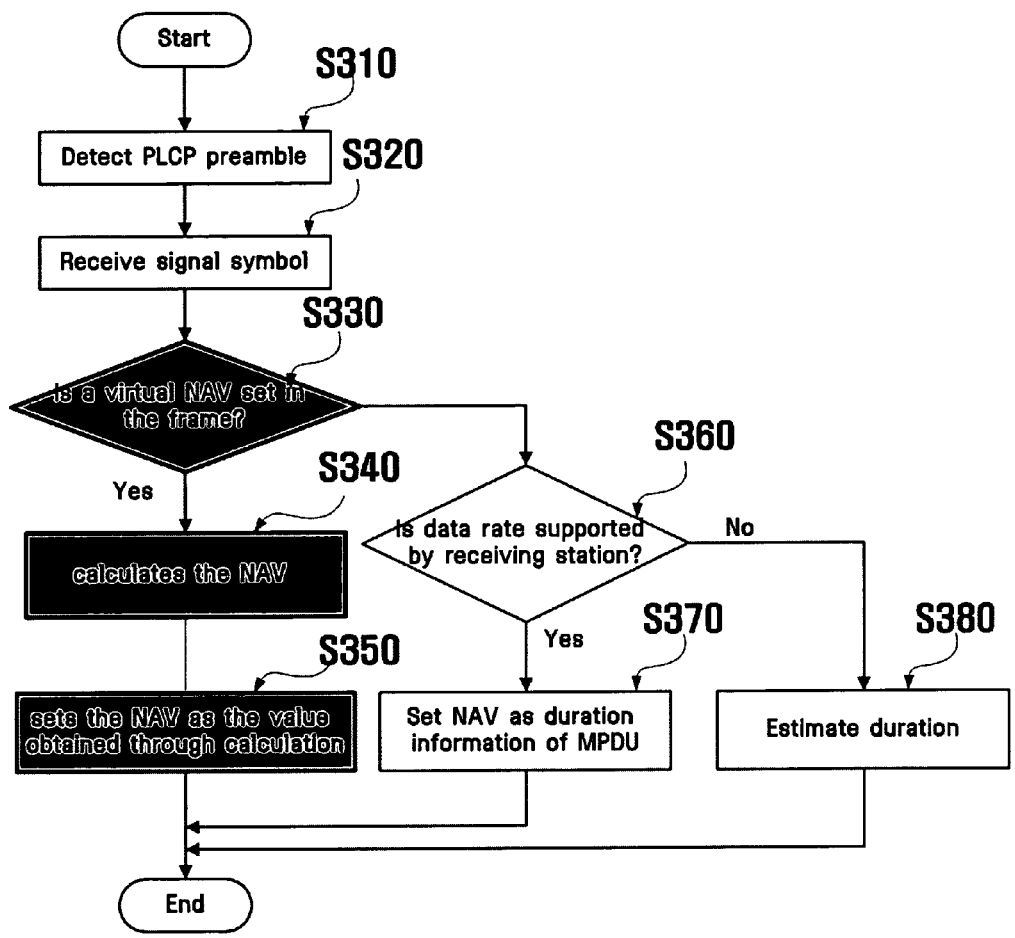
FIG. 11 illustrates the virtual carrier sensing procedure according to another exemplary embodiment of the present invention.

FIG. 11 illustrates the virtual carrier sensing procedure according to another exemplary embodiment of the present invention. In this exemplary embodiment, a structure of the frame is of the same as the structure of the previous frame, but the former enables a receiving station to perform the virtual carrier sensing with information included in the data length. For the virtual carrier sensing by the receiving station, a transmitting station records the value obtained by adding the length of the data portion in the frame and intervals between frames (SIFS, DIFS, etc.), and the length and signal of the preamble in another frame and the length of data.

The receiving station detects the PLCP preamble of a frame transmitted through a wireless medium S310. The station having detected the PLCP preamble is at the state of being capable of receiving OFDM symbols. The station having detected the PLCP preamble receives a signal symbol from the frame S320. The signal symbol includes therein information about the rate and the length.

After having received the signal symbol, the receiving station determines whether a virtual NAV value is set in the frame S330. In an exemplary embodiment of the present invention, whether the virtual NAV value is set in the frame is determined based on the value of reserved bit. For example, when a reserved bit is set to "0," the received frame refers to a previous frame to which the virtual NAV value is not set. When the reserved bit is set to "1," the received frame refers to which a frame to the virtual NAV value is set. In another exemplary embodiment, whether the virtual NAV value set in the frame is determined by the rate. Rate refers to a total 4 bits, and is defined as having a total 8 bits under IEEE 802.11a as illustrated in FIG. 6. The transmitting station informs the receiving station that whether the virtual NAV value is established in the frame, by use of eight rates reserved.

When the received frame refers to a frame to which the virtual NAV value is set, the receiving station calculates the NAV value S340. The NAV value can be calculated by the rate and the data length. Namely, the receiving station divides the data length by rate so as to calculate the NAV value. The receiving station having calculated the NAV value sets the NAV value as the value obtained through calculation S350.

When the received frame refers to the previous frame, the receiving station determines whether the rate obtained from the signal symbol can be supported by itself S360. Where the rate can be supported by the receiving station, the receiving station may obtain an MPDU and set the NAV value with the duration of the MPDU S370. Where the rate cannot be supported by the receiving station, the receiving station estimates the duration to set the NAV value to the EIFS S380. EIFS covers the time from the state having no physical carrier sensing to SIFS and ACK frames of the least rate, and DIFS and random backoff.

Next, a method of the transmitting station including NAV value information in the length and the rate will be described with reference to FIG. 5. Referring to this figure, the rate of the IEEE 802.11a standard PPDU frame comprises 4 bits, thereby designating a total rates. The length comprises 12 bits, thereby indicating a total 4,096 bytes at maximum. In this exemplary embodiment, the NAV value for virtual carrier sensing is set in the length. However, indication of the unit of length with a (byte(s) is just an example, and thus, the unit of length may be indicated with the number of OFDM symbols or time, and, for example, a microsecond.

For example, if the rate is 54 Mbps and data is 1500 bytes, the length will be calculated as follows. The OFDM symbol is transmitted for the time of 4 microseconds, and one OFDM symbol can transmit information of 216 bytes when the rate is 54 Mbps. On the other hand, the SIFS is 16 microseconds and the ACK frame to data comprises a preamble of 16 microseconds, a signal of 4 microseconds, and data (MPDU) of 16 bytes (1 OFDM symbol). SIFS corresponds to 4 OFDM symbols, namely to 864 bytes (216×4). Accordingly, the transmitting station records 3,660 bytes (1,500+864+1,296) in the length field of the frame.

If the rate is 6 Mbps and data is 1500 bytes, the length can be calculated as follows. OFDM symbol corresponds to 24 bytes. Thus, 1,740 bytes (1,500+24×4+24×6) are recorded in the length field.

This virtual carrier sensing of a physical layer may also be applied in a wireless LAN communication employing MIMO. The virtual carrier sensing of the physical layer in the WLAN employing MIMO will be described with reference to FIG. 12.

Figure 12:
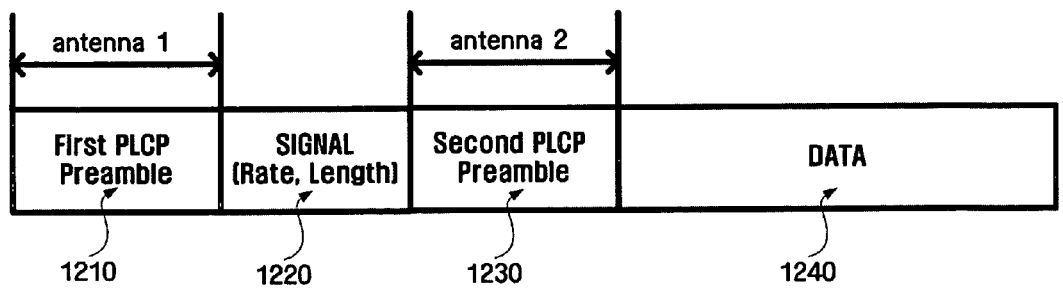
FIG. 12 illustrates a structure of MIMO PPDU according to one exemplary embodiment of the present invention.

FIG. 12 illustrates a structure of MIMO PPDU according to one exemplary embodiment of the present invention.

MIMO PPDU should comprise a plurality of preambles. The exemplary embodiment of FIG. 12 illustrates a structure of MIMO PPDU using two antennas. In an MIMO frame of this embodiment, a preamble for a second antenna is positioned next to signal so as to allow existing SISO stations to receive the signals.

Data frame includes a first PLCP preamble 1210, a signal 1220, a second PLCP preamble 1230 and data 1240.

The transmitting station records a value obtained by converting the second PLCP preamble 120 into bytes in the length of the signal 1220, a value obtained by converting the byte number of data 1240 and the SIFS into bytes, and a value obtained by converting an ACK frame into bytes.

As described above, a method and apparatus for transmitting and receiving information, and a method and apparatus for setting information in wireless network communications according to the present invention provide the following effects.

First, even when there is an error in the reception of frames transmitted according to various modulation schemes, virtual carrier sensing data can be obtained and delay time is reduced.

Second, even in such a wireless network communications without virtual carrier sensing data, the NAV value can be properly converted and transmitted to avoid collisions and reduce delay.

Third, by using reserved bit data, the methods and apparatuses according to the present invention can be made compatible with conventional techniques using NAV values. Fourth, information for the virtual carrier sensing in a physical layer can be provided without changing the structure of the conventional frame.

Numerous alterations and modifications of the present invention disclosed herein will present themselves to those skilled in the art. It is to be understood that the above described embodiment are for purposes of illustration only and not to be construed in a limited sense. It is therefore intended that the appended claims, rather than the detailed description of the present invention, encompass any of such modifications or embodiments.

All such modifications which do not depart from the spirit of the invention are intended to be included within the scope of the appended claims. In particular, the embodiments of the present invention described above with reference to OFDM modulation according to IEEE 802.11a are provided for illustration only and are not intended to limit the scope of the present invention. The present invention can be applied to any wireless network communications using various modulation schemes.

While not restricted thereto, exemplary embodiments may also be embodied as a non-transitory recording medium on which a program to execute a method according to an exemplary embodiment is recorded.

What is claimed is:

1. A method of setting virtual carrier sensing data in wireless network communications, the method comprising:
   receiving, by a station, a frame transmitted using a plurality of modulation schemes, wherein the frame includes at least a first segment modulated by a basic modulation scheme and a second segment which follows the first segment, and the first segment includes data for virtual carrier sensing, information indicating a length of the second segment and information indicating a data rate of the second segment;
   extracting the data for virtual carrier sensing from the first segment of the frame; and
   setting the extracted data as a parameter of a physical layer virtual carrier sensing indicator vector; and
   setting virtual carrier sensing using the extracted data set as the parameter of the physical layer virtual carrier sensing indicator vector,
   wherein the basic modulation scheme has a data rate which is supported by any station, and
   wherein the setting the virtual carrier sensing comprises transmitting the physical layer virtual carrier sensing indicator vector to a medium access control (MAC) layer.

2. The method of claim 1, wherein one of the modulation schemes is orthogonal frequency division multiplexing.

3. The method of claim 1, wherein the frame further includes a third segment which precedes the first segment and includes synchronization data.

4. The method of claim 1, wherein the extracting of the data is performed after checking whether there is an error in the first segment of the frame based on the basic modulation scheme.

5. The method of claim 1, wherein the data for virtual carrier sensing has the same bit size and the same value as virtual carrier sensing data received in the second segment.

6. The method of claim 1, further comprising transmitting the frame after the expiration of a duration of time corresponding to the set virtual carrier sensing.

7. The method of claim 1, wherein data for the virtual carrier sensing includes a value obtained by converting a section for the virtual carrier sensing into bytes.

8. A nontransitory recording medium on which a program to execute a method as claimed in claim 1 is recorded.

9. The method of claim 1, wherein the first segment includes two symbols and the data for virtual carrier sensing is contained in one of the symbols.

10. A method of transmitting data for virtual carrier sensing in wireless network communications for a plurality of modulated frames, the method comprising:
    generating, by a station, a frame which includes at least a first segment modulated by a basic modulation scheme and a second segment which follows the first segment, wherein the first segment includes virtual carrier sensing data, information indicating a length of the second segment and information indicating a data rate of the second segment; and
    transmitting the frame,
    wherein the basic modulation scheme has a data rate which is supported by any station,
    wherein the first segment is generated by transmitting the virtual carrier sensing data from a medium access control (MAC) layer to a physical layer, and
    wherein the transmitting the virtual carrier sensing data comprises storing the virtual carrier sensing data as a parameter of a vector of a physical layer virtual carrier sensing indicator and transmitting the vector to the physical layer.

11. The method of claim 10, wherein the basic modulation scheme is orthogonal frequency division multiplexing.

12. The method of claim 10, wherein the frame further includes a third segment which precedes the first segment and includes synchronization data.

13. The method of claim 10, wherein the first segment further includes a parity bit for error checking the first segment of the frame.

14. The method of claim 10, wherein the virtual carrier sensing data has the same bit size and the same value as virtual carrier sensing data included in the second segment.

15. The method of claim 10, wherein information for the virtual carrier sensing includes a value obtained by converting a section for the virtual carrier sensing into bytes.

16. A nontransitory recording medium on which a program to execute a method as claimed in claim 10 is recorded.

17. An apparatus for wireless network communications comprising:
    a frame receiving unit, which receives a frame transmitted using a plurality of modulation schemes and extracts virtual carrier sensing data from a first segment of the frame, wherein the frame includes at least the first segment and a second segment which follows the first segment, and the first segment is modulated by a basic modulation scheme and includes the virtual carrier sensing data, information indicating a length of the second segment and information indicating a data rate of the second segment;
    a frame generating unit, which adds the virtual carrier sensing data to the frame; and
    a transmitting unit, which sets virtual carrier sensing using the extracted data and transmits the frame based on the virtual carrier sensing,
    wherein the basic modulation scheme has a data rate which is supported by any station,
    wherein the frame receiving unit sets the virtual carrier sensing data as a parameter of a vector of physical layer virtual carrier sensing indicator and sends the vector to a medium access control (MAC) layer or to a physical layer.

18. The apparatus of claim 17, wherein the frame is transmitted on the basis of the extracted virtual carrier sensing data to avoid collision.

19. The apparatus of claim 18, wherein the frame receiving unit sends the data for virtual carrier sensing interpreted by the physical layer to the MAC layer.

20. The apparatus of claim 18, wherein the frame receiving unit sends the data for virtual carrier sensing generated by the MAC layer to the physical layer.

21. The method of claim 20, wherein information for the virtual carrier sensing includes a value obtained by converting a section for the virtual carrier sensing into a byte.

* * * * *